(12) United States Patent
Truc

(10) Patent No.: US 6,419,781 B2
(45) Date of Patent: *Jul. 16, 2002

(54) INDEX STICKER PRINT

(75) Inventor: James A. Truc, Eden Prairie, MN (US)

(73) Assignee: Eastman Kodak Company, Rochester, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,141

(22) Filed: Oct. 21, 1998

(51) Int. Cl.$^7$ ................................. B32B 31/00
(52) U.S. Cl. ................ 156/277; 345/350; 358/501; 358/505; 358/527; 395/117; 707/530
(58) Field of Search .................. 156/277; 395/117; 358/501, 505, 527; 345/350; 707/530

(56) References Cited

U.S. PATENT DOCUMENTS

| | | | |
|---|---|---|---|
| 4,966,285 A | 10/1990 | Otake et al. | 206/455 |
| 5,031,773 A | 7/1991 | Manico et al. | 206/455 |
| 5,259,504 A | 11/1993 | Manico | 206/455 |
| 5,318,659 A | 6/1994 | Manico et al. | 156/538 |
| 5,400,152 A | 3/1995 | Manico et al. | 358/501 |
| 5,436,694 A | 7/1995 | Ishikawa et al. | 355/75 |
| 5,447,827 A | 9/1995 | Ishikawa et al. | 430/434 |
| 5,617,171 A | 4/1997 | Ishikawa et al. | 396/512 |
| 5,623,581 A | 4/1997 | Attenberg | 395/106 |
| 5,702,800 A | 12/1997 | Mihayashi et al. | 428/144 |
| 5,709,496 A | 1/1998 | Werner et al. | 402/79 |
| 5,745,252 A | 4/1998 | Rauh et al. | 358/302 |
| 5,749,468 A | 5/1998 | Manico et al. | 206/455 |
| 5,764,870 A | 6/1998 | Manico et al. | 395/117 |

Primary Examiner—Nasser Ahmad
(74) Attorney, Agent, or Firm—Kinney & Lange

(57) ABSTRACT

An index sticker print is created where small photographic images are printed on individual sticker blanks contained on a sticker blank carrier. The photographic images are derived from digital image data obtained when the photographic film is scanned. The digital image data is formatted to size and is sent to a printer which then prints the digital data onto the sticker blanks creating an index sticker print.

8 Claims, 3 Drawing Sheets

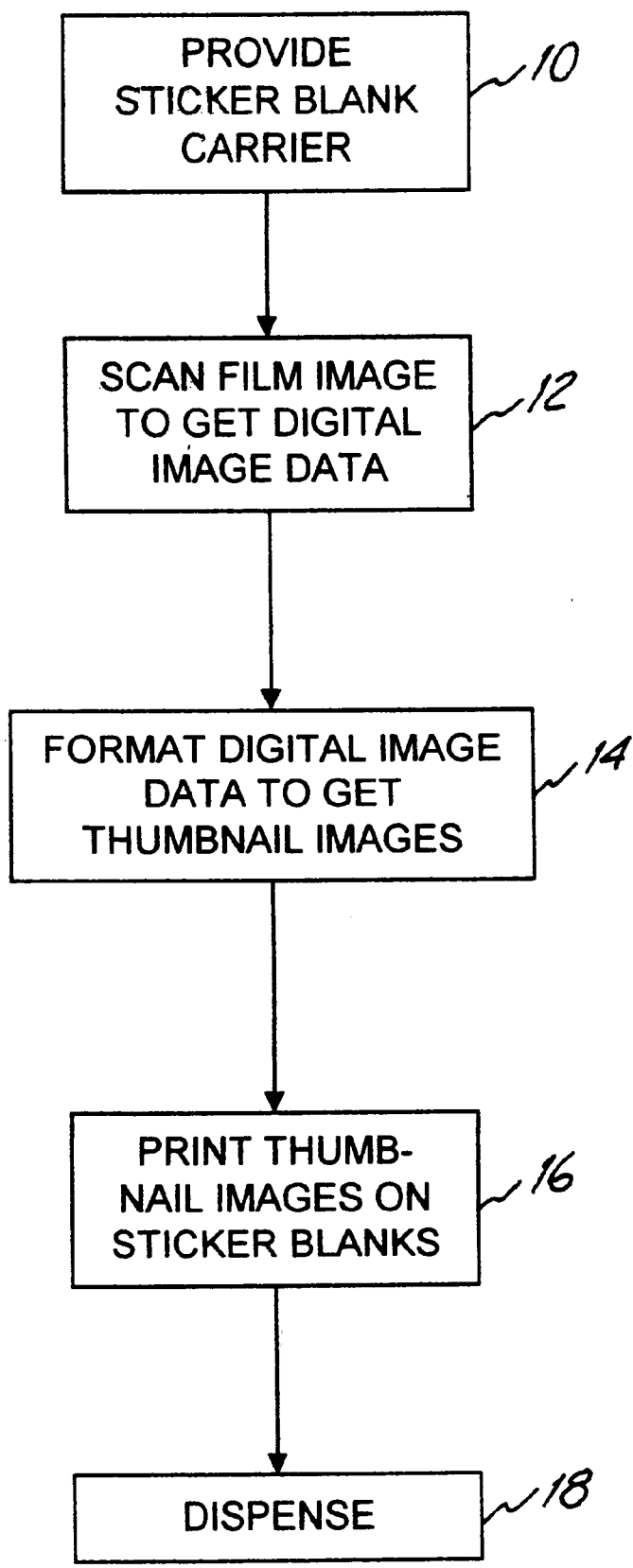

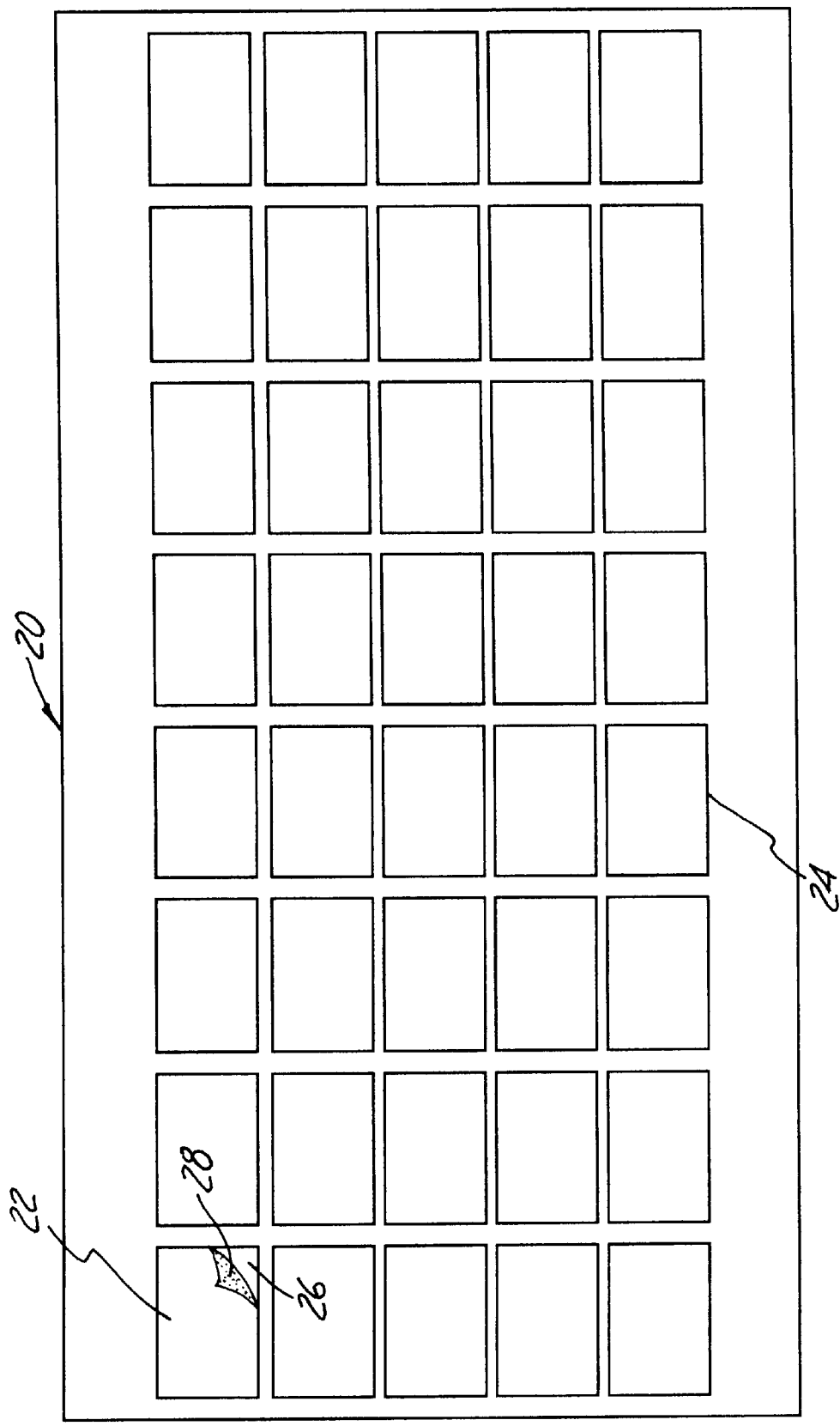

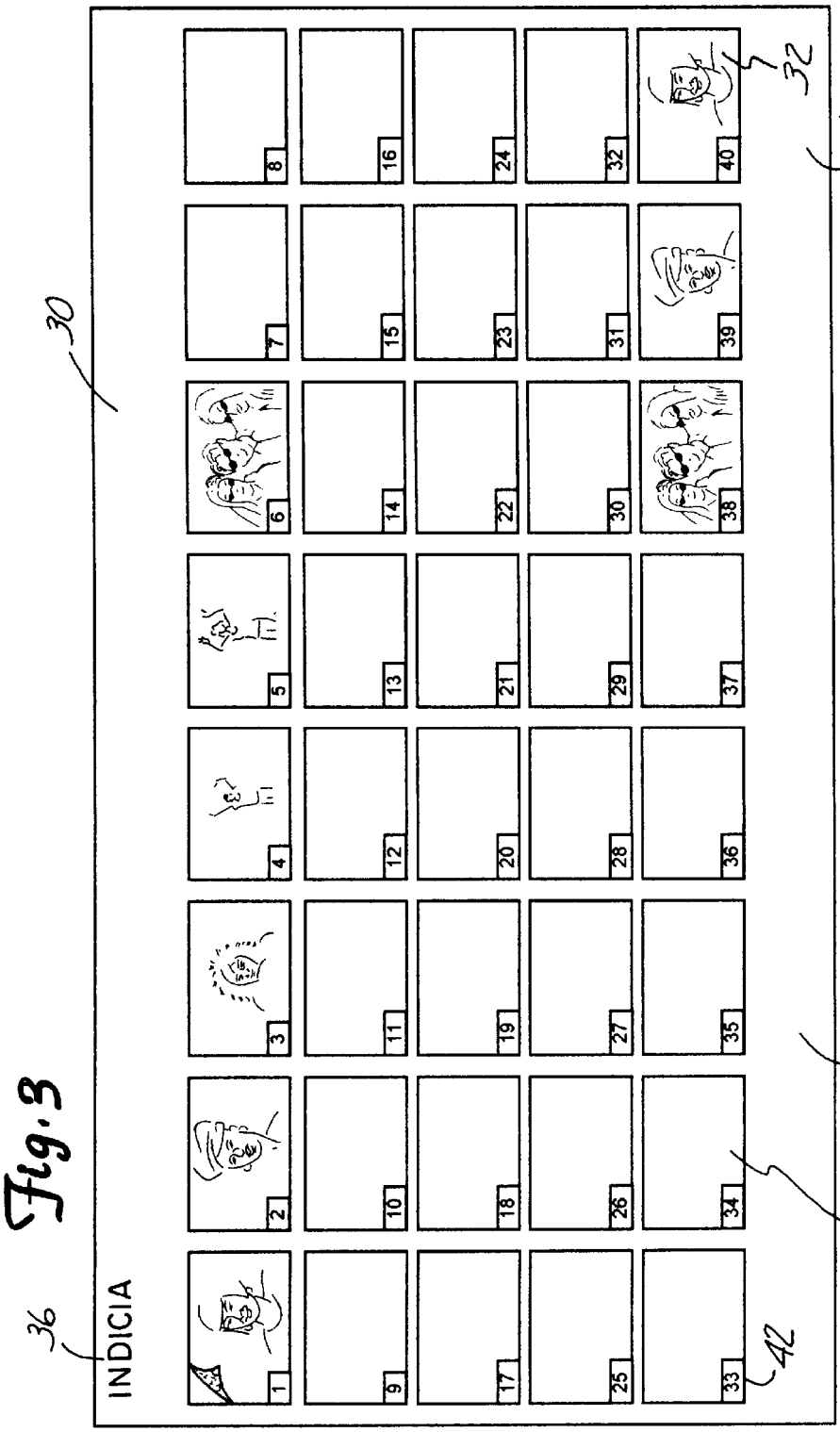

INDEX STICKER PRINT

CROSS-REFERENCE TO RELATED APPLICATION(S)

None.

BACKGROUND OF THE INVENTION

This invention relates to the area of stickers. More particularly, this invention relates to making stickers from index prints that are produced when a photographic film is developed.

Stickers can be both fun and functional and are used by people of all ages and sexes. Children collect stickers and use them to decorate any number of items. Adults likewise use stickers to decorate items, and may also use them as labels or as a way to hold envelopes closed. There are several types of stickers that are commercially available, but it is not possible for consumers to buy personalized stickers made with the consumer's own photographs.

Index prints are available to consumers after a film is developed. These index prints contain small thumbnail images of each photographic image that appears on the film. The goal of index prints is to aid the consumer in identifying which photographs appear on which film negative. Unfortunately, the index print often gets separated from the film negatives and as such, has limited value for its intended purpose.

BRIEF SUMMARY OF THE INVENTION

The present invention combines the fun of stickers with the utility of index prints. By printing an index print as stickers, the present invention allows a consumer to peel off and use a personalized sticker. Alternately, the present invention allows the consumer to leave the stickers in place for an intact index print.

Index sticker prints are made by providing a sticker blank carrier with a specific number of sticker blanks. Since most films contain a maximum of thirty-six exposures, but may allow for taking a few extra pictures, the number of stickers blanks is set at greater than thirty-six.

A photographic film image is scanned to produce digital image data for each image on the film. Once this digital image data is collected, the data can be formatted to produce images of a size corresponding to the size of the sticker blanks. In printing the stickers, each individual digital image corresponding to each photographic image on the film is printed on a sticker blank. This results in one sticker of every image on the film. If there are more stickers blanks than there are photographic images on the film, some photographic images can be repeated to fill the empty sticker blanks. Once the printing is complete, the finished stickers are dispensed to the consumer who can then peel and use the stickers from their backing as stickers.

BRIEF DESCRIPTION OF THE DRAWINGS

FIG. 1 is a flow diagram of the process for creating an index sticker print.

FIG. 2 is the top view of a sticker blank carrier.

FIG. 3 is a graphic depiction of an index sticker print.

FIG. 4 is an enlarged side view of the index sticker print.

DETAILED DESCRIPTION

FIG. 1 is a flow diagram setting out the process for creating an index sticker print. First step 10 is to provide a sticker blank carrier 20 as shown in FIG. 2. Second step 12 requires that film images be scanned to get digital image data. Third step 14 formats the digital image data so that each image will fit on a sticker blank 22. Next, fourth step 16 requires that the images be printed onto sticker blanks 22. Fifth step 18 is simply to dispense the results to a consumer.

FIG. 2 shows a sticker blank carrier 20 ready for printing. The carrier 20 consists of several individual sticker blanks 22. Each sticker blank 22 has a precut edge 24 to allow the sticker blank 22 to be peeled off a backing 26. The backside of the sticker blank 22 has an adhesive coating 28 that allows the user to adhere the sticker onto another surface.

The sticker blank carrier 20 has greater than thirty-six sticker blanks 22, and more preferably, greater than thirty-nine sticker blanks 22. Each sticker blank 22 is of a predetermined size such that they can be arranged and placed on the sticker blank carrier 20. The carrier 20 shown in FIG. 2 has forty sticker blanks 22. Films commonly come in twenty-four or thirty-six exposures, but may allow for a few extra pictures to be taken, resulting in slightly over twenty-four or thirty-six photographs. Thus, if there are greater than thirty-six sticker blanks 22 on the sticker blank carrier 20, it can be ensured that every image on a film can be printed at least once as a sticker. If there are more sticker blanks 22 than there are photographic images on the film, certain selected photographic images can be repeated and printed again on the empty sticker blanks 22. Alternatively, the empty sticker blanks 22 can be filled by simply repeating images from the beginning of the film and printing those images in the empty sticker blanks 22.

FIG. 3 is a graphic representation of an index sticker print 30. On each stamp blank 22 a thumbnail image 32 has now been printed, creating an index sticker 38. The thumbnail image 32 is slightly larger than the sticker blank 22, such that the precut edges 24 fall on the inside of the thumbnail image 32 and truncate it. A border 40 surrounds the stickers 38. On this border 40 it is possible for other indicia 36 to be printed, such as date, company identification, or other notations or descriptions. The stickers 38 are arranged in rows and columns and may be identified with an index number 42. The index numbers 42 are normally printed at the same time the thumbnail images 32 are printed on the sticker blanks 22. The index number 42 could also be printed on the backing 34 rather than the sticker 38.

FIG. 4 shows an enlarged side view of the index sticker print 30. FIG. 4 makes clear that the index sticker 38 is coated with an adhesive layer 52 on its bottom surface. Thus the stickers 38 can be peeled from the backing 54 and adhered to another surface. There are many options for composition of the adhesive layer 52. Any adhesive that is strong enough to adhere to several surfaces, but not so strong as to prevent it from being removed from the backing 54 would be suitable. Several such adhesives are available and are well known in the art. Likewise, several options exist for the materials used for the stickers 38 and the backing 54 which are well known in the art.

In collecting the digital image data as noted in Step 2 of FIG. 1, a scanner may be used to scan a photographic film negative. When using a scanner, the photographic film negative image is projected onto a linear scanner. The scanner scans the image and collects an electronic representation of it. One such scanner that is suitable is the Pakon Film Scanner described in U.S. patent application Ser. No. 08/604,330, filed Feb. 2, 1996). Once collected, this electronic image is converted into digital image data which can be formatted to make the image suitable for printing. Formatting may consist of sizing, sharpening, or otherwise manipulating the digital image data to prepare it for printing. Once formatted, the digital image data can be sent to a printer.

The index sticker print 30 can be created by using an ink jet printer capable of at least 300 dpi. Once such printer is the Desk Jet 1200C manufactured by Hewlett Packard®. The printer receives the digital image data and uses it to print the thumbnail image 32 on the sticker blanks 22, creating an index sticker print 30 corresponding to the photographic images on the photographic film negative. When finished printing, a completed index sticker is dispensed to the consumer.

Although the present invention has been described with reference to preferred embodiments, workers skilled in the art will recognize that changes may be made in form and detail without departing from the spirit and scope of the invention.

What is claimed is:

1. A method for creating an index sticker print, the method comprising:

providing a sticker blank carrier having greater than 36 sticker blanks of a predetermined size, wherein each sticker blank has a pre-cut edge and an adhesive coating on its backside;

scanning photographic film to produce digital image data for each image on the photographic film;

formatting the digital image data to produce printed images of a size corresponding to the sticker blanks; and printing each image based on the formatted digital image data on one of the sticker blanks to form an index sticker print, wherein a sticker blank can be separated from the index sticker print at the pre-cut edge.

2. The method of claim 1 and further comprising:

dispensing the index sticker print to a customer.

3. The method of claim 1 wherein each photographic image on the photographic film is printed at least once on a sticker blank; and if there are more sticker blanks than photographic images on the photographic film, selected photographic images are reprinted on empty sticker blanks.

4. The method of claim 1 wherein each photographic image on the photographic film is printed at least once on a sticker blank; and if there are more sticker blanks than photographic images on the photographic film, photographic images from a beginning of the photographic film are reprinted on empty sticker blanks.

5. The method of claim 1 wherein the image printed on the sticker blank is one photographic image on the photographic film repeated on each blank.

6. The method of claim 1 wherein the sticker blank carrier has at least 39 sticker blanks.

7. A method for creating an index sticker print, the method comprising:

providing a sticker blank carrier having a plurality of removable sticker blanks of a predetermined size;

scanning the photographic film to produce digital image data for each image on the photographic film;

formatting the digital image data to produce printed images of a size corresponding to the sticker blanks; and printing each image based on the formatted digital image data on one of the removable sticker blanks to form an index sticker print.

8. A method for creating an index sticker print, the method comprising:

providing a sticker blank carrier having a plurality of removable sticker blanks of a predetermined size, wherein each sticker blank has a pre-cut edge and an adhesive coating on its backside;

scanning the photographic film to produce digital image data for each image on the photographic film;

formatting the digital image data to produce printed images of a size which is slightly larger than the sticker blanks; and forming the index sticker print by printing each image based on the formatted digital image data on one of the sticker blanks so that the pre-cut edge falls within the image, wherein a sticker blank having an image thereon is removable from the index sticker print at the pre-cut edge.

* * * * *